United States Patent [19]
Cooper

[11] Patent Number: 5,342,146
[45] Date of Patent: * Aug. 30, 1994

[54] METHOD AND APPARATUS FOR TREATMENT OF CONTAMINATED SOIL PARTICLES

[75] Inventor: George A. Cooper, San Antonio, Tex.

[73] Assignee: Cooper Equipment Company, San Antonio, Tex.

[*] Notice: The portion of the term of this patent subsequent to Aug. 3, 2010 has been disclaimed.

[21] Appl. No.: 121,278

[22] Filed: Sep. 14, 1993

Related U.S. Application Data

[63] Continuation-in-part of Ser. No. 2,760, Jan. 12, 1993, Pat. No. 5,271,694.

[51] Int. Cl.$^5$ ............................ B09B 3/00; E02D 3/12
[52] U.S. Cl. ................................. 405/128; 405/258
[58] Field of Search .............. 405/258, 128, 129, 263, 405/264; 110/246, 346, 347

[56] References Cited

U.S. PATENT DOCUMENTS

| | | | |
|---|---|---|---|
| 4,849,360 | 7/1989 | Norris et al. | |
| 4,913,586 | 4/1990 | Gabbita | 405/129 |
| 4,927,293 | 5/1990 | Campbell | 405/128 |
| 4,942,929 | 7/1990 | Malachosky et al. | 405/128 X |
| 4,993,498 | 2/1991 | Fresnel | |
| 5,024,770 | 6/1991 | Boyd et al. | 210/747 |
| 5,039,415 | 8/1991 | Smith | |

*Primary Examiner*—Dennis L. Taylor
*Attorney, Agent, or Firm*—Cox & Smith Incorporated

[57] ABSTRACT

A method and apparatus for decontaminating hydrocarbon contaminated soil particles comprises an upwardly directed conveyor which passes the soil through shredding knives to breakup the soil into a plurality of particles having a preselected maximum size. The stream of particles are directed against a downwardly inclined deflector to be directed downwardly toward a ground or concrete surface to form a growing conical pile of contaminated soil particles. A first set of spray nozzles, located above the particle stream, directs a spray of water containing decontaminating agents into the contaminated soil particle stream generally parallel to and within the stream of the contaminated soil particles, thus moistening the particles and assisting in producing a rolling action of the particles down the sides of the growing conical pile of particles. A second spray is utilized to direct a stream of water containing decontaminating agents against the underside of the stream of soil particles and the two sets of sprays provide a effective water barrier against the release into the atmosphere of aromatic materials carried by the contaminated soil particles.

13 Claims, 11 Drawing Sheets

NOZZLE CONFIGURATION

Low Volume Flow Rates

| Flow Rate | Pressure | A | B | C | D | E | F | G |
|---|---|---|---|---|---|---|---|---|
| 0.5 gpm | 20 psi | ON | | | | | | |
| 0.6 gpm | 30 psi | ON | | | | | | |
| 0.7 gpm | 40 psi | ON | | | | | | |
| 0.8 gpm | 50 psi | ON | | | | | | |
| 0.8 gpm | 60 psi | ON | | | | | | |
| 0.9 gpm | 20 psi | | ON | | | | | |
| 1.1 gpm | 30 psi | | ON | | | | | |
| 1.3 gpm | 40 psi | | ON | | | | | |
| 1.4 gpm | 50 psi | | ON | | | | | |
| 1.5 gpm | 60 psi | | ON | | | | | |
| 1.6 gpm | 30 psi | | | ON | | | | |
| 1.7 gpm | 30 psi | ON | ON | | | | | |
| 1.8 gpm | 40 psi | | | ON | | | | |
| 2.0 gpm | 40 psi | ON | ON | | | | | |
| 2.0 gpm | 50 psi | | | ON | | | | |
| 2.5 gpm | 30 psi | | | | ON | | | |
| 2.5 gpm | 40 psi | ON | ON | | | | | |
| 3.0 gpm | 20 psi | | ON | | ON | | | |
| 3.0 gpm | 40 psi | | | | ON | | | |
| 3.0 gpm | 60 psi | ON | ON | | | | | |
| 3.5 gpm | 20 psi | | | | | ON | | |
| 3.5 gpm | 60 psi | | | | ON | | | |
| 4.0 gpm | 50 psi | ON | | | ON | | | |
| 4.5 gpm | 50 psi | | ON | | ON | | | |
| 4.5 gpm | 60 psi | ON | ON | ON | | | | |
| 5.0 gpm | 30 psi | | | ON | ON | ON | | |
| 5.0 gpm | 40 psi | ON | ON | | ON | | | |
| 5.0 gpm | 60 psi | | | ON | ON | | | |
| 5.5 gpm | 20 psi | | | | | | ON | |
| 5.5 gpm | 40 psi | ON | | | ON | | | |
| 5.5 gpm | 60 psi | | | ON | ON | | | |
| 6.0 gpm | 20 psi | ON | | | | ON | | |
| 6.0 gpm | 40 psi | | ON | ON | ON | | | |
| 6.0 gpm | 50 psi | ON | | | ON | | | |
| 6.5 gpm | 30 psi | | | | | | ON | |
| 6.5 gpm | 40 psi | | | ON | ON | | | |
| 6.5 gpm | 50 psi | | | ON | ON | ON | | |

| Flow Rate | Pressure | A | B | C | D | E | F | G |
|---|---|---|---|---|---|---|---|---|
| 7.0 gpm | 20 psi | ON | | | | | | ON |
| 7.0 gpm | 30 psi | | ON | ON | | ON | | |
| 7.5 gpm | 20 psi | | | | ON | | ON | |
| 7.5 gpm | 30 psi | ON | ON | ON | | ON | | |
| 7.5 gpm | 40 psi | | | | | | ON | |
| 8.0 gpm | 40 psi | | | ON | ON | | ON | |
| 8.0 gpm | 50 psi | ON | | ON | | ON | | |
| 8.0 gpm | 60 psi | ON | ON | ON | ON | | | |
| 8.5 gpm | 20 psi | | | ON | | ON | | ON |
| 8.5 gpm | 50 psi | | | | ON | ON | | |
| 9.0 gpm | 20 psi | | | | | ON | ON | |
| 9.0 gpm | 30 psi | | | | ON | | ON | |
| 9.0 gpm | 40 psi | | | ON | | ON | ON | |
| 9.5 gpm | 30 psi | ON | ON | | | | | ON |
| 9.5 gpm | 40 psi | | | | ON | ON | ON | |
| 9.5 gpm | 60 psi | | | ON | ON | | ON | |
| 10.0 gpm | 30 psi | ON | ON | ON | ON | ON | | |
| 10.0 gpm | 40 psi | ON | | ON | | | ON | |
| 10.0 gpm | 50 psi | | | ON | | ON | ON | |
| 10.5 gpm | 30 psi | | | ON | ON | | | ON |
| 10.5 gpm | 40 psi | | | | ON | | ON | |
| 10.5 gpm | 50 psi | | | | ON | ON | ON | |
| 11.0 gpm | 20 psi | | | | ON | ON | ON | |
| 11.0 gpm | 30 psi | ON | ON | ON | | | | ON |
| 11.0 gpm | 50 psi | | | ON | | | | ON |
| 11.5 gpm | 20 psi | ON | | | ON | ON | ON | |
| 11.5 gpm | 40 psi | ON | ON | ON | ON | ON | | |
| 11.5 gpm | 60 psi | | | | ON | ON | ON | |
| 12.0 gpm | 30 psi | | | | | ON | | ON |
| 12.0 gpm | 40 psi | | | ON | ON | | | ON |
| 12.0 gpm | 50 psi | | | ON | ON | ON | ON | |
| 12.5 gpm | 30 psi | ON | ON | | | ON | ON | |
| 12.5 gpm | 40 psi | ON | ON | ON | | | | ON |
| 12.5 gpm | 50 psi | ON | ON | ON | | | ON | |

FIG. 4A

NOZZLE CONFIGURATION

| Flow Rate | Pressure | A | B | C | D | E | F | G |
|---|---|---|---|---|---|---|---|---|
| 13.0 gpm | 30 psi |  | ON | ON | ON |  |  | ON |
| 13.0 gpm | 40 psi | ON |  | ON | ON |  | ON |  |
| 13.0 gpm | 50 psi |  | ON |  | ON |  | ON |  |
| 13.5 gpm | 30 psi |  | ON | ON |  | ON | ON |  |
| 13.5 gpm | 40 psi |  | ON | ON | ON |  | ON |  |
| 13.5 gpm | 50 psi | ON |  |  | ON |  |  | ON |
| 14.0 gpm | 30 psi | ON |  | ON |  | ON |  | ON |
| 14.0 gpm | 40 psi |  |  | ON |  | ON | ON |  |
| 14.0 gpm | 50 psi |  | ON |  | ON |  |  | ON |
| 14.5 gpm | 20 psi | ON |  |  | ON |  | ON | ON |
| 14.5 gpm | 30 psi |  |  |  | ON | ON |  | ON |
| 15.0 gpm | 30 psi | ON |  |  |  |  | ON | ON |
| 15.0 gpm | 40 psi |  | ON |  |  | ON |  | ON |
| 15.0 gpm | 50 psi |  | ON | ON | ON |  | ON |  |
| 15.5 gpm | 30 psi |  |  | ON |  |  | ON | ON |
| 15.5 gpm | 40 psi |  | ON | ON |  |  | ON | ON |
| 15.5 gpm | 50 psi | ON |  | ON | ON |  |  | ON |
| 16.0 gpm | 30 psi |  |  | ON | ON | ON | ON | ON |
| 16.0 gpm | 40 psi | ON | ON | ON |  |  | ON | ON |
| 16.0 gpm | 50 psi |  |  | ON | ON | ON |  | ON |
| 16.5 gpm | 30 psi | ON |  | ON |  |  | ON | ON |
| 16.5 gpm | 40 psi |  |  |  |  |  | ON | ON |
| 16.5 gpm | 50 psi | ON |  | ON |  | ON | ON |  |
| 17.0 gpm | 30 psi |  |  |  | ON |  | ON | ON |
| 17.0 gpm | 40 psi |  | ON | ON |  | ON |  | ON |
| 17.0 gpm | 50 psi |  |  |  | ON | ON |  | ON |
| 17.5 gpm | 30 psi | ON |  |  | ON |  | ON | ON |
| 17.5 gpm | 40 psi | ON | ON | ON |  | ON |  | ON |
| 17.5 gpm | 50 psi | ON |  |  |  | ON | ON | ON |
| 18.0 gpm | 20 psi | ON |  |  | ON | ON | ON | ON |
| 18.0 gpm | 30 psi |  | ON |  | ON |  | ON | ON |
| 18.0 gpm | 40 psi |  |  |  | ON | ON |  | ON |
| 18.5 gpm | 20 psi |  |  | ON |  | ON | ON | ON |
| 18.5 gpm | 30 psi |  |  |  | ON | ON |  | ON ON |
| 18.5 gpm | 40 psi | ON | ON |  |  |  | ON | ON |

NOZZLE CONFIGURATION

| Flow Rate | Pressure | A | B | C | D | E | F | G |
|---|---|---|---|---|---|---|---|---|
| 19.0 gpm | 30 psi | ON |  | ON | ON |  | ON | ON |
| 19.0 gpm | 40 psi | ON |  | ON |  |  | ON | ON |
| 19.0 gpm | 50 psi | ON | ON |  | ON | ON | ON |  |
| 19.5 gpm | 30 psi |  | ON | ON | ON |  | ON | ON |
| 19.5 gpm | 40 psi |  |  |  | ON |  | ON | ON |
| 19.5 gpm | 50 psi |  | ON |  |  |  | ON | ON |
| 20.0 gpm | 30 psi | ON | ON | ON | ON |  | ON | ON |
| 20.0 gpm | 40 psi | ON |  |  | ON |  | ON | ON |
| 20.0 gpm | 50 psi |  |  |  | ON |  | ON | ON |
| 20.5 gpm | 40 psi | ON | ON | ON | ON | ON |  | ON |
| 20.5 gpm | 60 psi |  |  | ON | ON | ON | ON |  |
| 21.0 gpm | 30 psi |  |  |  | ON | ON | ON | ON |
| 21.0 gpm | 40 psi |  |  |  | ON | ON |  | ON ON |
| 21.0 gpm | 50 psi | ON | ON | ON | ON | ON | ON |  |
| 21.5 gpm | 30 psi | ON |  |  | ON | ON | ON | ON |
| 21.5 gpm | 50 psi |  | ON | ON |  |  | ON | ON |
| 22.0 gpm | 40 psi | ON |  |  |  | ON | ON | ON |
| 22.0 gpm | 50 psi | ON |  |  | ON |  | ON | ON |
| 22.0 gpm | 60 psi |  |  |  | ON |  | ON | ON |
| 22.5 gpm | 30 psi |  |  | ON | ON | ON | ON | ON |
| 22.5 gpm | 40 psi |  | ON | ON | ON |  | ON | ON |
| 22.5 gpm | 50 psi |  | ON |  | ON |  | ON | ON |
| 23.0 gpm | 40 psi |  |  |  | ON |  | ON | ON |
| 23.0 gpm | 60 psi | ON |  | ON | ON | ON |  | ON |
| 23.5 gpm | 50 psi | ON | ON |  | ON |  | ON | ON |
| 23.5 gpm | 60 psi |  | ON | ON |  |  | ON | ON |
| 24.0 gpm | 40 psi |  |  |  | ON |  | ON ON | ON |
| 24.0 gpm | 50 psi | ON |  | ON | ON |  | ON | ON |
| 24.5 gpm | 40 psi |  | ON | ON |  |  | ON | ON |
| 24.5 gpm | 50 psi |  | ON | ON | ON |  | ON | ON |
| 24.5 gpm | 60 psi | ON | ON | ON | ON | ON |  | ON |
| 25.0 gpm | 40 psi | ON | ON | ON |  |  | ON | ON |
| 25.0 gpm | 50 psi |  | ON |  |  |  | ON | ON |
| 25.0 gpm | 60 psi |  | ON |  |  | ON |  | ON ON |

FIG. 4B

NOZZLE CONFIGURATION

| Flow Rate | Pressure | A | B | C | D | E | F | G |
|---|---|---|---|---|---|---|---|---|
| 25.5 gpm | 40 psi |  | ON |  | ON | ON | ON | ON |
| 25.5 gpm | 50 psi | ON | ON |  |  | ON | ON | ON |
| 25.5 gpm | 60 psi |  |  | ON | ON |  | ON | ON |
| 26.0 gpm | 40 psi |  |  | ON | ON | ON | ON | ON |
| 26.0 gpm | 50 psi | ON |  | ON |  | ON | ON | ON |
| 26.5 gpm | 40 psi | ON |  | ON | ON | ON | ON | ON |
| 26.5 gpm | 50 psi |  |  |  | ON | ON | ON | ON |
| 26.5 gpm | 60 psi | ON |  |  |  | ON | ON | ON |
| 27.0 gpm | 50 psi |  | ON | ON |  | ON | ON | ON |
| 27.0 gpm | 60 psi |  | ON | ON | ON |  | ON | ON |
| 27.5 gpm | 50 psi | ON | ON | ON |  | ON | ON | ON |
| 28.0 gpm | 40 psi | ON | ON | ON | ON | ON | ON | ON |
| 28.0 gpm | 50 psi |  |  | ON |  | ON | ON | ON |
| 28.0 gpm | 60 psi | ON | ON |  |  | ON | ON | ON |

NOZZLE CONFIGURATION

| Flow Rate | Pressure | A | B | C | D | E | F | G |
|---|---|---|---|---|---|---|---|---|
| 28.5 gpm | 50 psi |  |  | ON | ON | ON | ON | ON |
| 29.0 gpm | 60 psi |  |  |  | ON | ON | ON | ON |
| 29.5 gpm | 60 psi |  |  | ON | ON |  | ON | ON |
| 30.0 gpm | 50 psi |  |  | ON | ON | ON | ON | ON |
| 30.0 gpm | 60 psi | ON |  |  | ON | ON | ON | ON |
| 30.5 gpm | 60 psi |  |  | ON |  | ON | ON | ON |
| 31.0 gpm | 50 psi | ON | ON | ON | ON | ON | ON | ON |
| 31.5 gpm | 60 psi | ON | ON |  | ON | ON | ON | ON |
| 32.0 gpm | 60 psi | ON |  | ON | ON | ON | ON | ON |
| 33.0 gpm | 60 psi |  | ON | ON | ON | ON | ON | ON |
| 33.5 gpm | 60 psi | ON | ON | ON | ON | ON | ON | ON |

FIG. 4C

METHOD AND APPARATUS FOR TREATMENT OF CONTAMINATED SOIL PARTICLES

RELATIONSHIP TO CO-PENDING APPLICATION

This application is a continuation in part of co-pending application Ser. No. 08/002,760, filed Jan. 12, 1993, now U.S. Pat. No. 5,271,694.

FIELD OF INVENTION

The present invention relates to environmental protection, and particularly to the thermal, remediation of oil or chemically polluted soil through the application thereto of either chemical or bacteriological substances capable of removing the contamination from the soil particles.

BRIEF DESCRIPTION OF PRIOR ART

The wide-spread pollution of water and soil with off or other deleterious chemical components is attributed to the ever growing volumes of well output, transportation, refining, storage and utilization of oil, oil products and other chemicals. Traditional methods of recovery, such as mechanical, chemical and physical fail to provide a sufficient degree of recovery of contaminated soil within a reasonable time period. It has therefore been suggested and tried to achieve soil decontamination by resort to the resources of nature itself, i.e., the effective use of bacterial microorganisms capable of assimilating the hydrocarbons of oil. This method has been employed with a reasonable degree of success when applied to oil polluted water but, when the attempt is made to apply microorganisms to soil, the success rate has not been significant.

A major problem involved in effecting the decontamination of contaminated soil particles through the utilization of microorganisms is the fact that a significant degree of moisture must be present at all times while the microorganisms are doing their work. When a large area, such as a beach, is being treated, the water content of the soil or sand is solely dependent upon the weather conditions. Moreover, the physical handling of the soil for treatment represents a substantial problem and has resulted in time consuming and expensive operations such as described in Smith U.S. Pat. No. 5,039,415 wherein the contaminated soil is successively treated with microorganisms and then permitted to lie in a layer during which time the water content normally evaporates. The soil in the layer is then turned over, then picked up and retreated a second and even a third time. The treatment of the soil particles by the Smith patent method involves the upward discharge of the soil particles which are impacted with a water spray during the so called dwell period of their discharge path. The speed of movement of the particles is necessarily high, hence this method of treatment results in a large amount of the surfaces of the soil particles never being contacted by the aqueous solution of the appropriate bacteria or microorganisms. Additionally, toxic aromatics may be released from the soil particles.

Norris, et al. U.S. Pat. No. 4,849,360 proposed to treat oil contaminated soil by placing the soil in a pit after having microorganisms applied thereto and then passing a gas containing oxygen into the layer of soil to maintain the layer in an aerobic condition.

U.S. Pat. No. 4,993,498 to Fresnel deals primarily with the treatment of beach sand to eliminate exogenous pathogenic germs which thrive in a beach sand environment. A portable machine is provided which picks up the sand to be treated and separates the sand from other wastes. The sand is then projected as a cloud into a container and concurrently subjected to a horizontal spray of liquid containing the chemical-bacteriological decontaminating elements. In an alternate embodiment, the sand is treated by the spray during the fall onto a screen. The Fresnel patent is important in that it recognizes the need for spraying a minimum quantity of fluid on the sand to be treated such that a majority of the sand grains are wet, without unnecessarily soaking the entire terrain.

There is a need, therefore, for an apparatus capable of treating soil particles at a high mass rate, say up to 200 tons per hour, and effectively applying an aqueous solution containing the chemical and/or bacteriological treating agents or microbes to the soil particles in such manner that substantially all of the surfaces of each soil particle is contacted by the treatment liquid.

SUMMARY OF INVENTION

This invention provides a method and apparatus for treatment of contaminated soil by a solution of anti-contaminant chemicals and/or bacteriological agents in such manner that substantially all of the contamination is removed from the soil in a much shorter time that has been possible with prior art methods.

This method of this invention contemplates the utilization of a standard soil shredder such as the shredder currently sold by Royer Industries, Inc. of Kingston, Pa. Such shredder has a hopper for receiving contaminated soil by the dumping of loads of such soil into the hopper by large loaders. The machine conventionally separates large rocks and trash from the soil and passes the soil by a shredding belt through rows of steel teeth that shred, mix and aerate the soil and reduce the soil to particles having a substantially uniform maximum size.

In accordance with this invention, the soil particles are elevated by shredding conveyor to a position above a non-contaminated or protected soil area, or a concrete slab, if one is available, and the soil particles are discharged downwardly from the conveyor in such fashion as to form an ever-growing conically shaped pile of particles.

Concurrently with the deposit of the contaminated particles on the noncontaminated surface, a liquid spray comprising a water emulsion containing one or more chemical and/or bacteriological treatment agents is produced, which falls in a downward direction in a generally conical pattern to impact on all of the external surface of the growing conical pile of particles. More importantly, the deposition of the soil particles in a conical pile inherently produces a rolling action of the particles down the side of the pile and this rolling action is facilitated by the downward discharge of the treatment solution. It is thereby assured that areas of each particle which were not directly impacted by the liquid spray of decontamination solution while falling are contacted by the liquid during their roll down the sides of the ever growing cone of particles. Thus a very high percentage of particles have all of their exposed surfaces contacted by the anti-contaminating solution.

In recognition of the fact that the action of the microbes or bacteriological agents is highly dependent upon the existence of moisture, this invention preferably provides means for measuring the moisture content of the particles in the pile. This may be accomplished by a center post in the pile containing moisture measuring detectors at vertically spaced intervals on the posts so that the water content of the treated particles may be continuously monitored as the conical pile is formed. The same post may support a plurality of generally radial pipes to supply air or water to the interior of the conical pile.

After the conical pile has reached the desired maximum height, which is determined by the height of the discharge conveyor on the shredding machine, the shredding machine may be moved so that the discharge conveyor overlies another uncontaminated area and a second pile of treated particles may be built up.

After the requisite time period required for the reaction of the microbes and/or chemicals with the contaminating agents on the particles, the center post is removed and the treated soil particles in each pile is picked up by loaders and restored to the area from which the contaminated particles has been removed or other allowed location.

Obviously, the flow rate of solution necessary to provide the proper level of predetermined water and remedial solution concentration to each yard of contaminated soil may be determined by reference to an appropriate chart. In a preferred embodiment of the invention, however, a computer or microprocessor is provided, as is a contaminated particle weighing apparatus. Such weighing apparatus generates signals for forming one input to the computer. The moisture detection apparatus disposed in each pile of treated particles is of the type that produces a second set of input signals to the computer indicating the moisture content of the growing pile. The computer then correlates these two inputs to vary the rate of speed of the conveyor drive which moves the raw contaminated soil to the shredder discharge elements of the soil particle forming machine, or to vary the flow volume of the treatment solution. The computer may also produce a display or a printout illustrating the mass rate per hour, the moisture content of the resulting pile of soil particles, the total tonnage of particles treated and the gallons of decontaminating solution utilized.

All of the foregoing statements summarizes the invention claimed in my co-pending application Ser. No. 08/002,760, filed Jan. 12, 1993. Further experimentation with bio-remediation of soil particles has resulted in improvements in the method and apparatus for application of the remediating solution to the soft particles and these improvements constitute the claimed subject matter of this application.

Instead of directing the sprays of remediation solution downwardly onto the growing conical pile of contaminated particles, this invention comprises directing the spray along a path parallel to the downward discharge flow of the particles from the outlet of the shredding machine. In other words, the sprayed droplets of remediation solution move along with the contaminated soil particles and may bounce from one particle to the other as they progress downwardly to the growing conical pile of contaminated particles.

As is well know, a stream of soil particles tends to pull along with it any adjacent fluids, such as air and droplets of water that may lie adjacent to the stream. Thus, the oxygenation of the soil particles is greatly improved during the fall of the particles from the discharge of the shredder and substantially more of the water spray containing the remediation agents is carried by the particles to the growing conical pile of contaminated materials.

Upon striking the conical pile, the water droplets assist in producing the rolling action of the particles down the sides of the conical pile, thus further increasing the exposure of the particles to contact with the remediation solution existing on the surface of the growing conical pile.

The utilization of this invention therefore substantially increases the moisture content of the conical pile of contaminated materials and thus minimizes the need for adding additional water to the interior of the pile to maintain the desired minimum water content required to keep the bacteriological microorganisms operating on the hydrocarbon contamination contained on the soil particles.

A further advantage of the modified arrangement of spray nozzles relative to the path of the contaminated soil particles, comprises the fact that an effective water barrier is provided which prevents the discharge into the air of aromatics that may be released from the contaminated soil particles when discharged from the shredder. The term aromatics includes volatile, low vapor pressure hydrocarbons such as, naptha, benzine, ethylbenzene, toluene and xylene. All of these aromatics will readily cling to the water droplets interspersed in the stream of contaminated particles, hence are not discharged into the atmosphere. By additionally providing a rectangular series of spray nozzles directed upwardly against the underside of the discharge stream of contaminated soil particles, all of the particles move through and with a plurality of water droplets, which effectively prevents the release of a large portion of the aromatics, while at the same time, permitting the bacteriological agents to work on the aromatics during the fall of the soil particles onto the conical pile.

Further advantages of the invention will be readily apparent to those skilled in the art from the following description, taken in conjunction with the annexed sheets of drawings, on which is shown the preferred embodiments of the invention.

DESCRIPTION OF DRAWINGS

FIGS. 4a, 4b and 4c constitute reproductions of a chart which may be utilized for manual control of the shredding and treatment apparatus illustrating the number of valves controlling the flow of treatment liquid through the spray nozzles that must be turned on in order to achieve desired flow rates at various flow pressures.

DESCRIPTION OF PREFERRED EMBODIMENTS

Bio-remediation or chemical remediation of contaminated soils is accomplished most effectively when a controlled application of remediation spray distributes the proper amounts of remediation agents (microbes or chemicals), nutrients or catalysts and water onto the contaminated soil particles.

Figure 1:
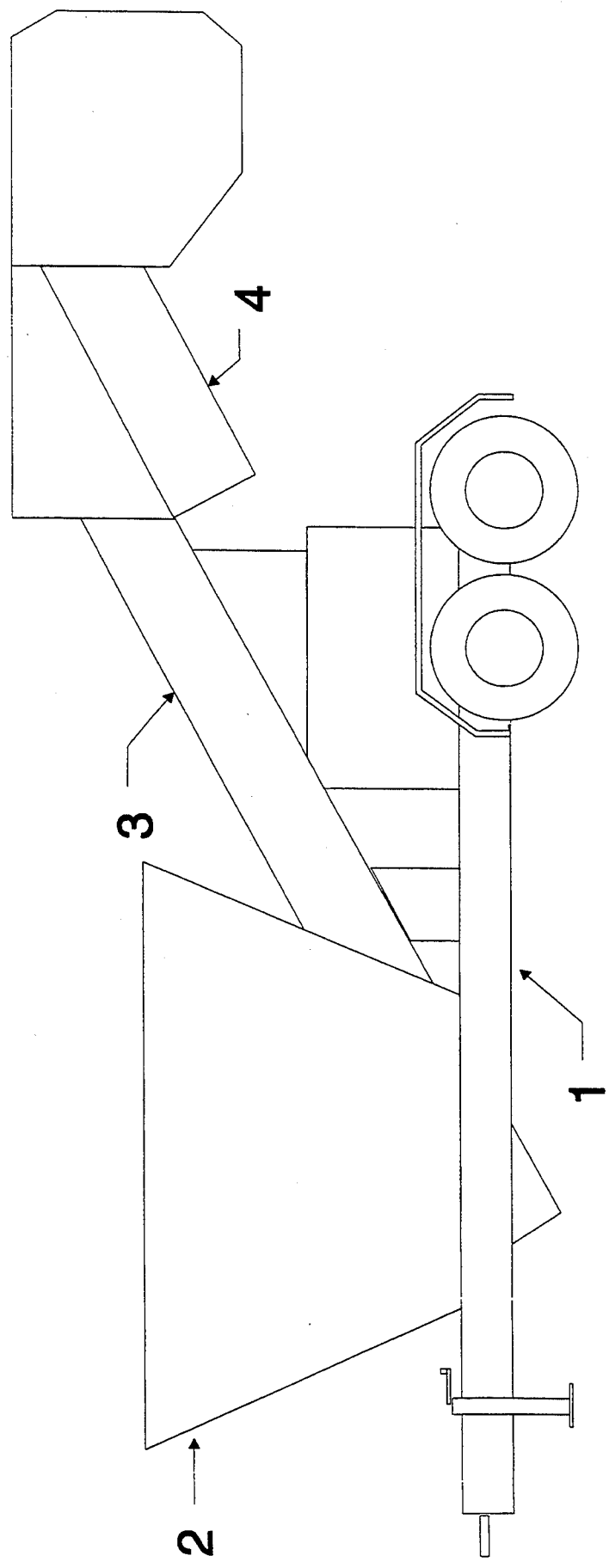
FIG. 1 is a schematic perspective view of a shredding machine for converting contaminated soil into soil particles of substantially uniform maximum size.
Figure 2:
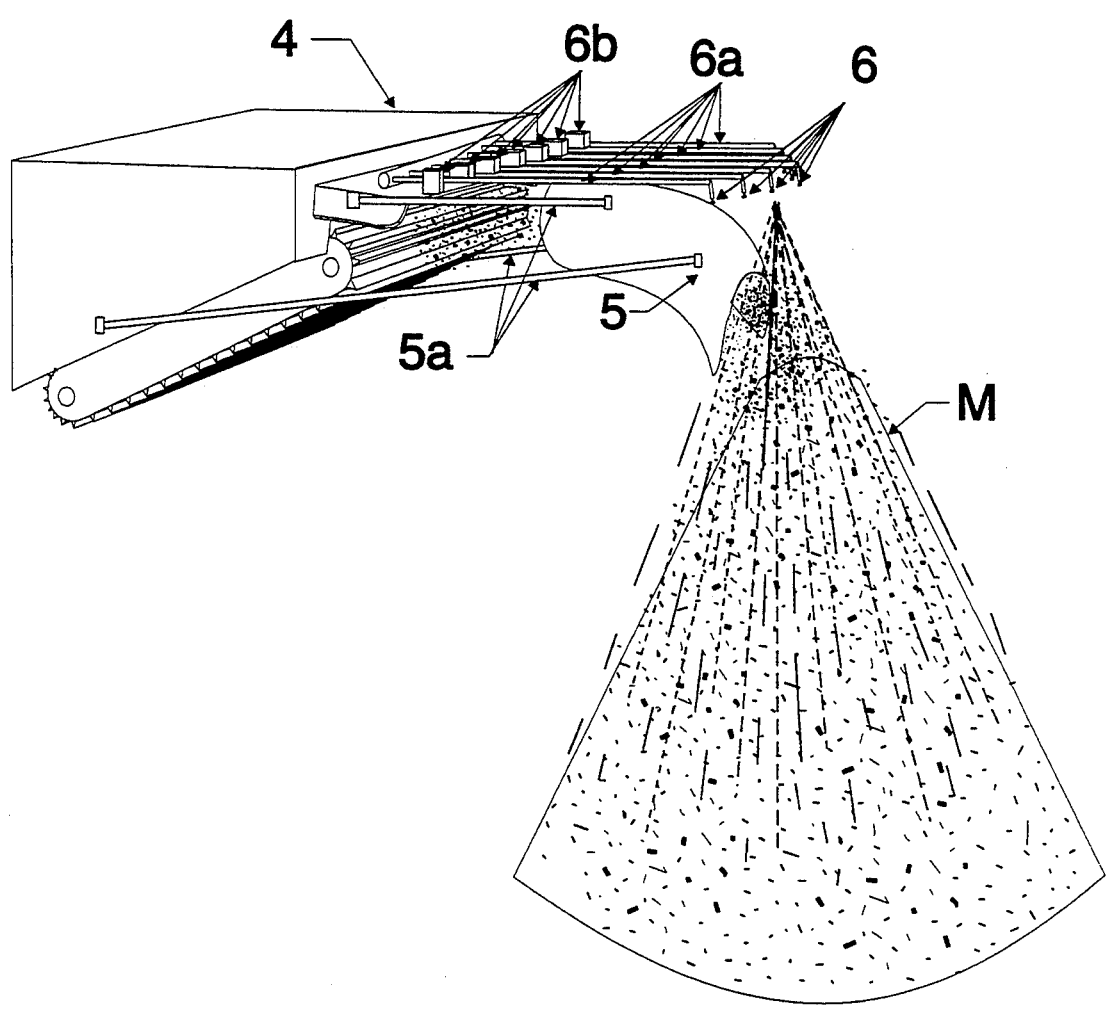
FIG. 2 is a schematic view of the discharge end of the machine of FIG. 1 illustrating the disposition of the spray nozzles relative to the conical pile of soft particles produced by discharge of soil particles from the shredding machine.
Figure 3:
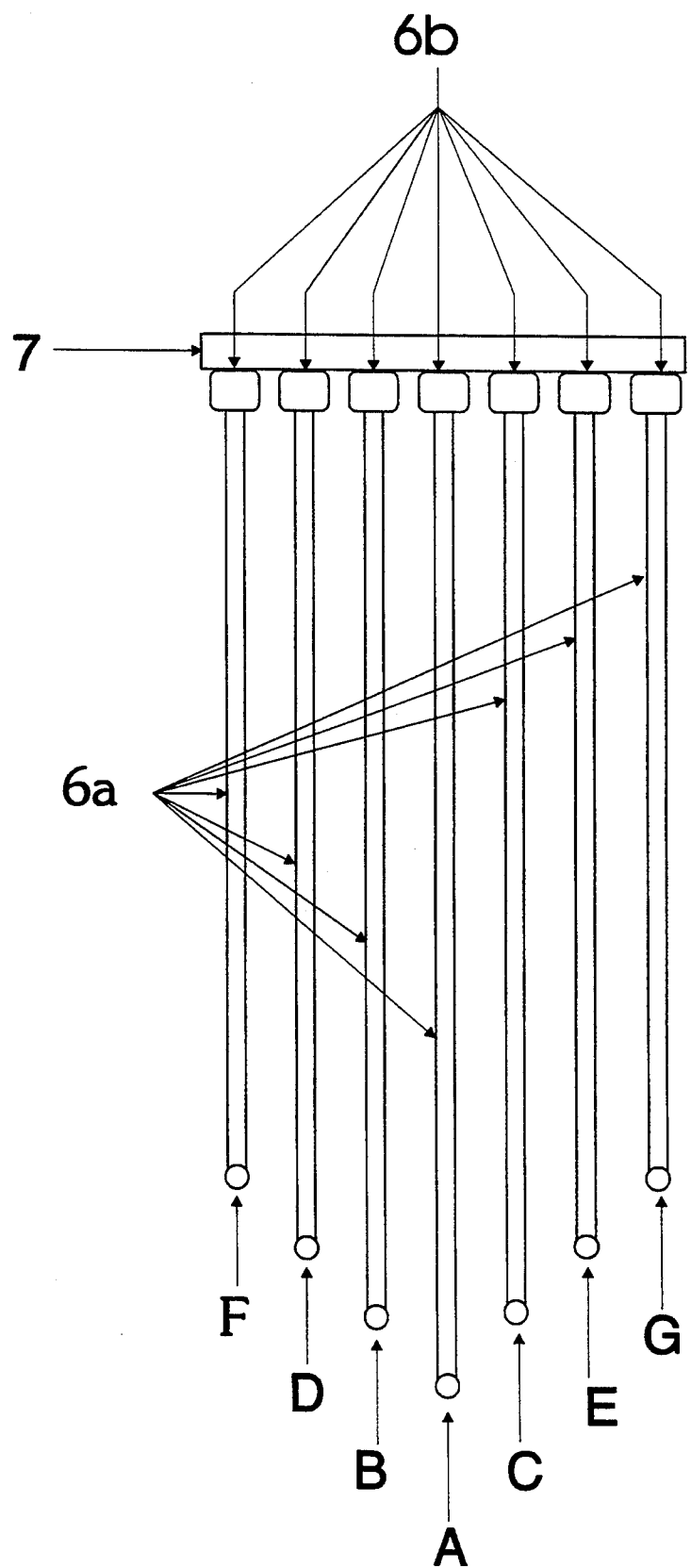
FIG. 3 is a schematic top view of the spray nozzles and their respective control valves.

As the contaminated soil is broken into small particles by a shredder or other means, the remediation spray is continuously applied onto a growing conical pile of contaminated soil. The application rate is predominately based on the existing moisture percentage in the conical pile of contaminated particles, the shredder soil discharge rate, and the amount of micro biological or chemical solution concentration. The end result of the process is to achieve the proper percent concentration of all ingredients applied evenly and thoroughly onto the contaminated particles to maximize the remediation effectiveness as well as minimize the remediation time. The flow rate in gallons per minute of the water solution containing the microbiological agents may be determined by the following formula:

$$G = M \times [(F-E)/(1-F)] \times 3.37$$

where
G = Pump flow rate (g.p.m.)
F = Final moisture content percentage
E = Existing moisture content percentage of soil particles
M = Soil particles flow rate in yards per hour The microbiological or chemical agents are added to water and mixed together in a separate tank, preferably a tank truck. Additionally, the flow rate charts shown in FIGS. 4a-4c provide the required valve configuration which will produce the desired flow rate. Each flow rate can be achieved with usually several different choices of fluid pressure. This allows for greater operator flexibility in choosing a spray pressure as well as choosing the number and location of spray nozzles to be utilized as the pile grows in height.

Referring to FIG. 1, there is schematically shown a well known form of soil shredder I which is marketed by Royer Industries, Inc. of Kingston Pa. Such machine includes a hopper 2 into which bucket loads of contaminated soil may be deposited by loaders. Such hopper normally includes a grate (not shown) at the upper portion thereof to prevent large stones and other unwanted debris from progressing downwardly into the hopper.

A conveyor 3 extends through the bottom of hopper 2 and moves the soil particles upwardly to enter a conventional soil shredder compartment 4 which constitutes another upwardly moving conveyor cooperating with a plurality of overlying, closely spaced blades (not shown) which effect the shredding of the soil into particles P of substantially uniform maximum size. The particles are discharged from the upper end of shredder 4 and in the embodiment shown in FIGS. 1–3, are thrown outwardly into contact with a generally parabolically shaped deflector 5 mounted by rods 5*a* to the upper end of the shredder 4, as best shown in FIG. 2. The function of the defector 5 is to direct the soil particles downwardly so as to produce a steadily growing conical mass M of contaminated soil particles which are preferably deposited on a non-contaminated soil surface or a concrete slab. If neither of these bases are available, a sheet of plastic may be employed overlaying contaminated soil upon which the growing conical mass of contaminated soil particles may be deposited.

In accordance with the invention, a plurality of downwardly directed spray nozzles 6 are mounted on the outer end of pipes 6*a* each of which extends back to as control valve unit 6*b* which is connected to a header 7. The nozzles are preferably disposed in an arcuate or angular array and the flow through the nozzles 6 is controlled to produce a generally conical spray on the growing conical shaped mass of soil particles.

The combination of directing the soil particles to form a growing conical shaped mass, plus the downward impact of the spray issuing from the nozzles 6, effects a rolling action of the contaminated soil particles down the sides of the conical shaped mass. Thus, particles which have portions not wet by the treatment liquid supplied from the nozzles 6 during their downward fall, tumble downwardly on the sides of the growing conical shaped mass of particles which are already wet. Thus, substantially 100% wetting of the surfaces of the soil particles by the treatment solution is produced.

The treatment solution utilized depends, of course, upon the nature of the contamination existing on the soil particles. For hydrocarbon contamination, for example, any of the treatment agents specified in the aforementioned Smith U.S. Pat. No. 5,039,415 may be utilized. All of these agents are of a bacteriological nature and, in effect, attack the hydrocarbon contamination and convert it into unobjectionable water and carbon dioxide.

For other forms of contamination, water solutions of appropriate treatment agents known in the prior art would be used.

As is well known, however, the decontamination action of bacteriological microbes on hydrocarbons is highly dependent upon the maintenance of a predetermined moisture content in the soil particles. For this reason, not only does the concentration of the bacteriological treatment agents in the water solution have to be carefully controlled, but also, the moisture content in the soil particles must be periodically determined and appropriate adjustments made in the amount of water applied to the growing conical mass of soil particles.

If the soil treatment is to be accomplished by manual controls, then the charts illustrated in FIGS. 4*a*–4*c* are very helpful in defining for the operator the desired number and location of nozzles that should be turned on for any particular pump pressure and flow rate desired. The position of the spray nozzles 6 is preferably disposed in an angular array as best illustrated in FIG. 3. If seven spray nozzles are to be utilized, the central nozzle is designated as nozzle A and the remaining nozzles are labeled as designated in FIG. 3. The corresponding valves 6b for each of the thus labeled nozzles 6 are identified by similar letters in the charts shown in FIGS. 4a–4c, together with the operational condition of each such valve for predetermined flow rate and predetermined pressure of the source of the water solution containing the decontaminating agents. The solution of decontaminating agents may be mixed and contained within an adjacent tank or tank truck. Any other tank and pump arrangement may be utilized for producing the desired pressure and flow rate of application of the decontaminating solution.

Figure 5:
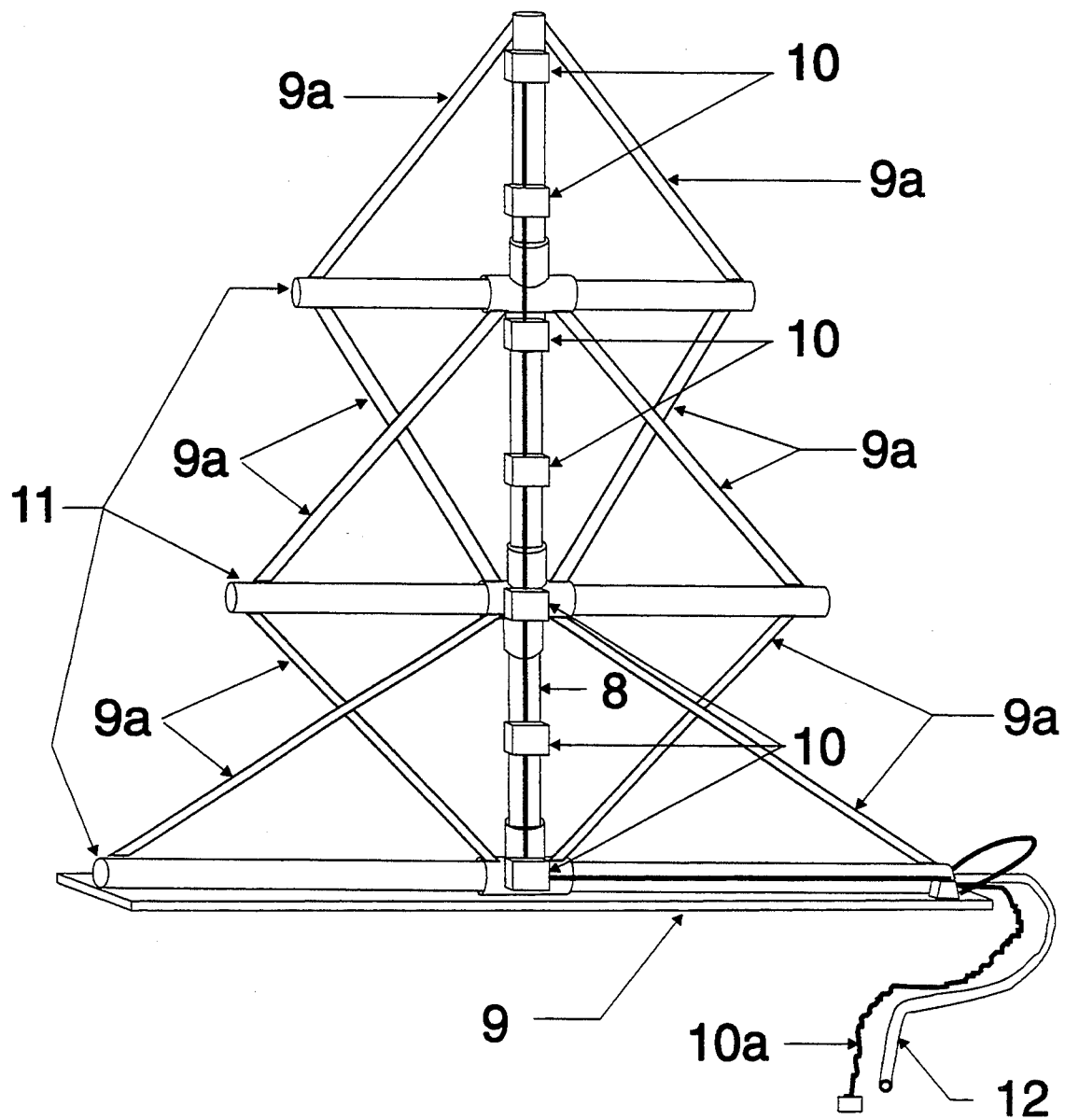
FIG. 5 is a schematic side elevational view of a moisture detecting structure around which a conical pile of soil particles is built.

In a preferred embodiment of this invention, a plurality of moisture probes 10 (FIG. 5) are mounted on a hollow center post 8 around which the conical mass of soil particles is built. Center post 8 is mounted in an upright position on a skid plate 9 and secured thereon by bracing 9a. Electrical leads 10a run up through hollow post 8 to each moisture detector 10.

In addition to the bracing 9a, a plurality of vertically spaced, horizontally disposed hollow pipes 11 may also be secured to the hollow center post 8 and provided with fluid communication with the interior of the hollow post 8. A hose 12 is then suitably connected to the interior of the hollow post 8 and thus a fluid, such as water or a water solution of treatment agents, may be transmitted through the center of the growing conical mass of soil particles and distributed through a plurality of small apertures (not shown) provided in the horizontal pipes 11 and the center post 8. In this manner, if the weather conditions are such that the conical mass of particles tends to achieve a moisture content below that desirable to promote the micro bacterial action, water may be supplied throughout the interior of the pile of particles through the hose 12. Alternatively, a flow of air may be passed through the pile as an aerating fluid to accelerate aerobic remediation processes and prevent solidification of the soil particles, if the ambient weather conditions tend to make the pile of particles wet enough to solidify. In either event, the moisture content of the pile is maintained at an optimum to promote the micro biological conversion of the contaminates on the soil particles into an environmentally acceptable form.

Figure 6:
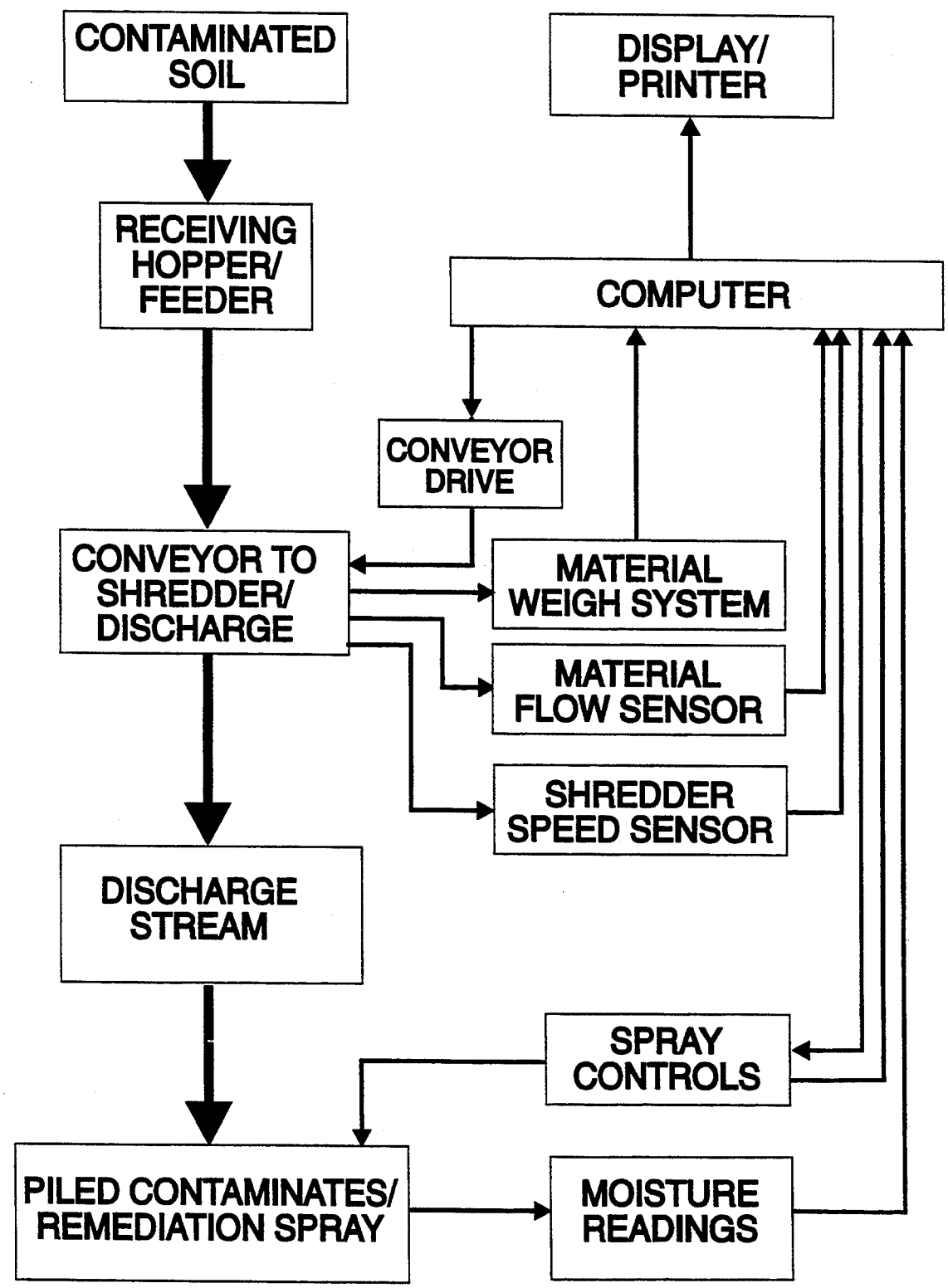
FIG. 6 is a schematic circuit diagram illustrating the application of a computer to effect the automatic control of the flow rate of treatment fluid applied to the pile of contaminated particles and the mass flow rate of the particles through the shredding machine as a function of the water content of the conical pile of contaminated particles.

Because of the criticalness of the moisture content and the concentration of bacteriological agents in achieving decontamination of the soil particles, the preferred embodiment of this invention incorporates a computer. The utilization of the computer is schematically shown in FIG. 6. Thus, signal inputs to the computer are derived from a conventional material weigh system to indicate the amount of soil being fed into the shredder and the rate of such flow. The computer also receives moisture content readings from the moisture detectors employed in the conical mass of soil particles. With these inputs, the computer is programmed to control the conveyor drive, the rate of flow of the solution containing the decontaminating agents and the particular valves that are opened or closed in order to obtain the desired optimum decontamination rate.

With such input factors being evaluated by the computer, the resultant conical mass of soil particles treated by the solution containing the decontaminating agents is subjected to the microbiological decontamination process with optimum moisture content and optimum concentration of decontaminating agents.

Additionally, as indicated in FIG. 6, the computer may have a display or printer output to indicate the total weight of treated soil particles and the total volume of decontaminating solution applied to the soil particles.

Figure 7:
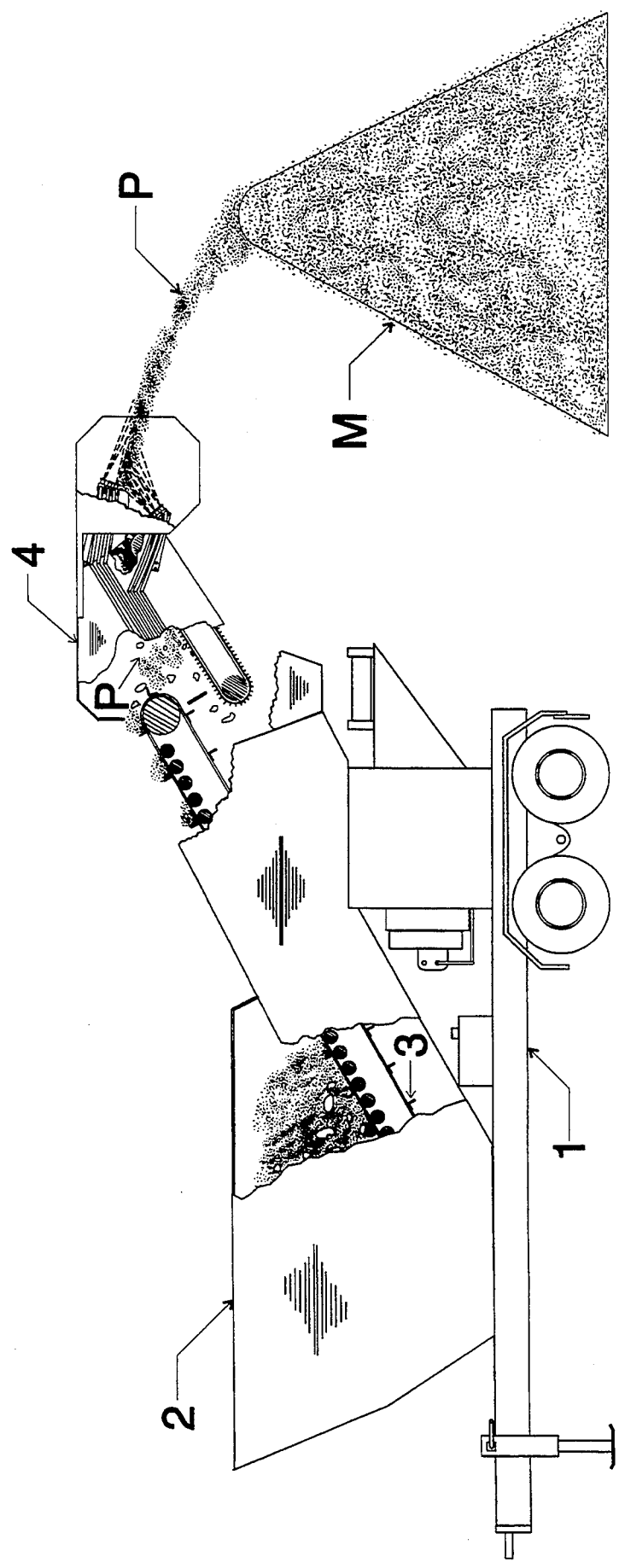
FIG. 7 is a schematic side elevational view, with portions thereof in section, of a shredding machine similar to FIG. 1, for converting contaminated soil into soil particles of substantially uniform maximum size and discharging said contaminated particles onto a suitable non-contaminated surface to produce a growing conical pile of particles.
Figure 8:
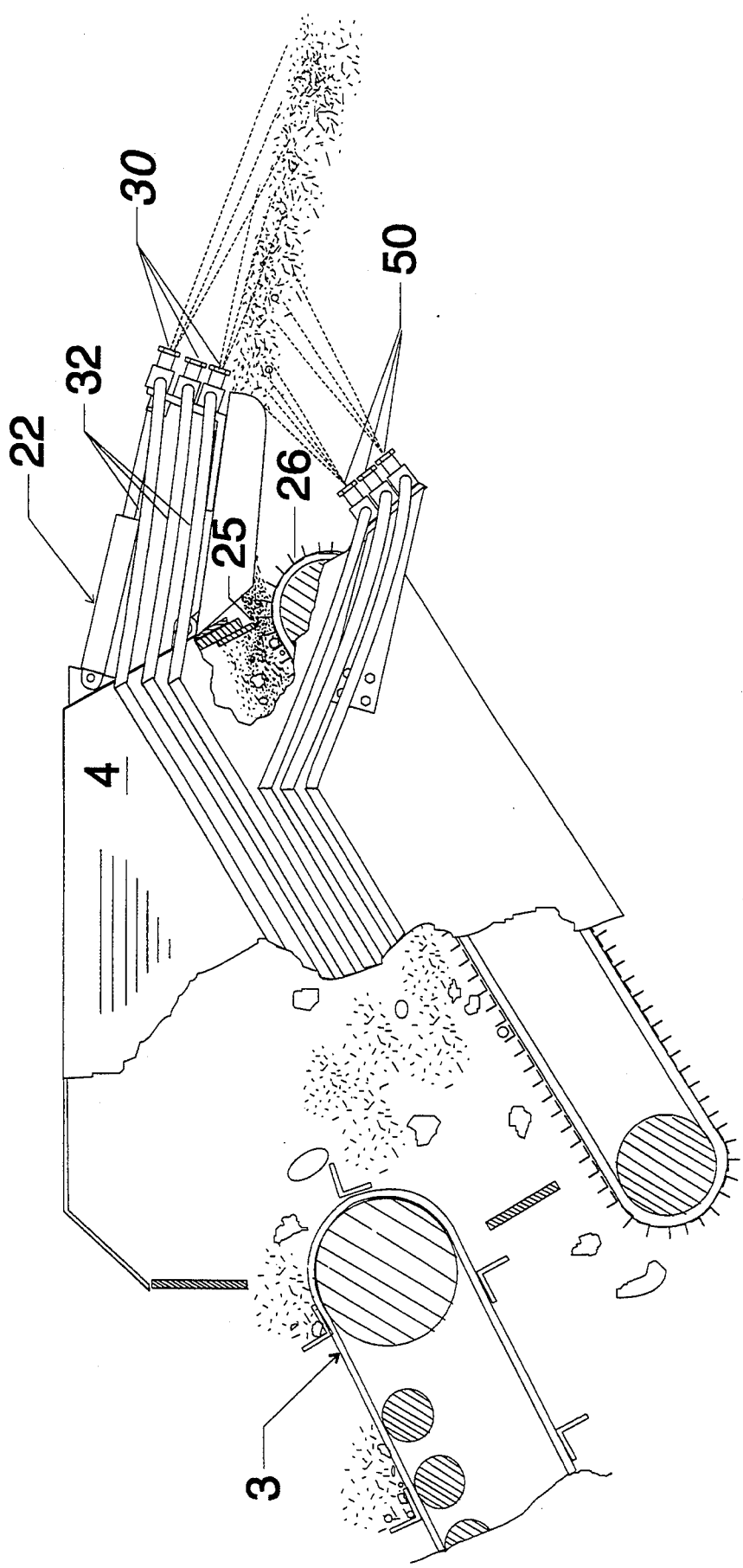
FIG. 8 is a perspective view of the discharge end of the machine of FIG. 7 illustrating the positioning of a baffle for directing the stream of contaminated soft particles in a generally downward direction.
Figure 9:
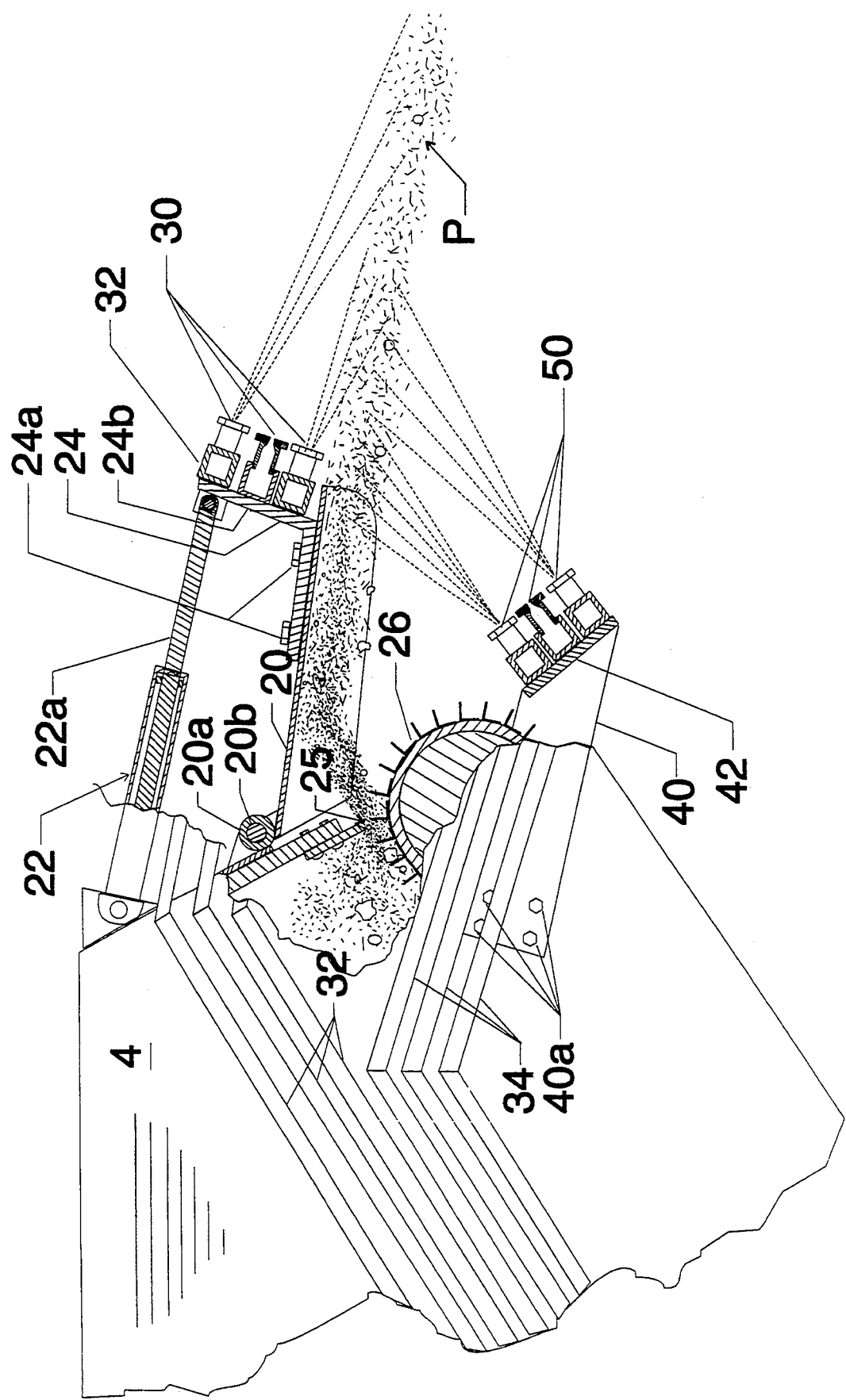
FIG. 9 is an enlarged scale side elevational view of the discharge end of the shredding machine of FIG. 7 with portions thereof shown in section.

In the modification of this invention shown in FIGS. 7–9, the contaminated soft particles are discharged from the shredding compartment 4 into contact with planar deflector 20 pivotally mounted by a tube 20a and shaft 20b to the outer wall of the shredder compartment 4, as best shown in FIG. 9. The deflector 20 is adjustable by a fluid pressure cylinder 22. An L-shaped bracket 24 is secured to the top surface of deflector 20 by bolts 24a and provides an upstanding wall 24b to which the piston rod 22a of cylinder 22 is secured. The function of the deflector 20 is to direct the soft particles P discharged from the shredder 25 downwardly so as to produce a steadily growing conical mass M (FIG. 7) of contaminated soil particles which are preferably deposited on a non-contaminated soil surface or a concrete slab. If neither of these bases are available, a sheet of plastic may be employed overlaying contaminated soft upon which the growing conical mass of contaminated soil particles may be deposited.

In accordance with this embodiment of the invention, a plurality of downwardly directed spray nozzles 30 are mounted on the outer face of wall 24b and supplied by pipes 32, each of which extends back to a control valve unit (not shown). The nozzles 30 are preferably disposed in a rectangular grid array and the flow through the nozzles 30 is directed to produce a spray generally parallel to and entering the stream of particles P, thus terminating on the growing conical shaped mass M of soil particles.

The combination of directing the soil particles to form a growing conical shaped mass, plus the downward impact of the spray issuing from the nozzles 30 effects a rolling action of the contaminated soil particles down the sides of the conical shaped mass. Thus, any particles which have portions not wet by the treatment liquid supplied from the nozzles 30 during their downward fall, tumble downwardly on the sides of the growing conical shaped mass of particles which are already wet. Thus, substantially 100% wetting of the surfaces of the soil particles by the treatment solution is produced.

As stated above, the treatment solution utilized depends, of course, upon the nature of the contamination existing on the soil particles. For hydrocarbon contamination, for example, any of the treatment agents specified in the aforementioned Smith U.S. Pat. No. 5,039,415 may be utilized. All of these agents are of a bacteriological nature and, in effect, attack the hydrocarbon contamination and convert it into unobjectionable water, carbon dioxide, fatty acids, and other non-toxic products.

For other forms of contamination, water solutions of appropriate treatment agents known in the prior art would be used.

As is well know, however, the decontamination action of bacteriological microbes on hydrocarbons is highly dependent upon the maintenance of a predetermined moisture content in the soil particles. For this reason, not only does the concentration of the bacteriological treatment agents in the water solution have to be carefully controlled, but also, the moisture content in the soil particles should be periodically determined and appropriate adjustments made in the amount of water applied to the growing conical mass of soil particles. Thus the control procedures and apparatus previously described in connection with FIGS. 1–6, would also be utilized in the modification of FIGS. 7–9.

A further improvement of this invention constitutes the establishment of a water barrier within and surrounding the stream of contaminated soil particles to prevent the discharge into the atmosphere of aromatics that may be intermixed with the soil particles.

A pair of brackets 40, of which only one is shown, are secured by bolts 40a to the forward end of the shredding chamber 4 in forwardly projecting relationship and disposed on each side of the soil particle conveyor 26. A cross-plate 42 is rigidly supported by brackets 40 and provides a mounting for a plurality of nozzles 50, disposed in a generally rectangular grid relationship and supplied by pipes 34 and conventional control valves (not shown) with pressured water containing the decontaminating agents. The nozzles 50 are positioned to impact against the lower side of the stream of particles P and cooperate with the sprays from nozzles 30 to provide an effective saturation of the particle stream to prevent any significant discharge of aromatic hydrocarbons contained in the stream of soil particles.

It is therefore readily apparent to those skilled in the art that the method and apparatus of this invention provides an optimum system for effecting hydrocarbon, chemical or biological decontamination of contaminated soil particles. Modifications of this invention will be readily apparent to those skilled in the art and it is intended that all such modifications be included within the scope of the appended claims.

I claim:

1. The method of treating contaminated soil with an aqueous solution of decontaminating agents comprising:
   breaking the contaminated soil into particles of substantially uniform maximum size;
   forming a downwardly directed stream of contaminated soil particles impinging onto a selected surface in a manner to build a growing cone shaped mass of contaminated soil particles; and
   concurrently directing a spray of an aqueous solution of decontaminating agents into said stream in a direction substantially parallel to and within said stream of contaminates soil particles, whereby a portion of said aqueous spray moistens said particles by contact therewith and the remainder of said aqueous spray contacts the upper portions of said growing pile to produce moistening of said growing pile and assist in rolling of newly deposited particles down the sides of said cone shaped mass to expose more of each particle's surface area to contact by said aqueous solution of decontaminating agents.

2. The method of claim 1 further comprising the step of:
   continuously measuring the water content of said particles in said cone shaped mass; and
   adjusting the flow rate of said downward discharge to maintain a selected minimum water content and a selected concentration of decontaminating agents in said growing cone shaped mass of contaminated soil particles.

3. The method of claim 2 further comprising the step of providing a plurality of adjustable flow rate, downwardly directed, horizontally spaced spray nozzles to apply said downward discharge of the aqueous solution of decontaminating agents; and
   selectively adjusting the flow rates of said nozzles to maintain said selected minimum water content and concentration of decontaminating agents in said growing cone-shaped mass of contaminated soil particles.

4. The method of claim 3 further comprising the step of providing a computer;
   measuring moisture content of said growing cone-shaped mass and entering signals in said computer representing said varying moisture content;
   weighing the mass flow rate of said stream of particles and entering signals in said computer representing said mass flow rate; and
   controlling the mass flow rate of said stream of contaminated particles and the flow rates of said nozzles by said computer to maintain a selected minimum moisture content in said growing cone shaped mass of contaminated particles.

5. The method of claim 4 further comprising the steps of utilizing said computer to indicate total mass of particles treated.

6. The method of claim 4 further comprising the steps of utilizing said computer to indicate total gallonage of decontaminating solution applied.

7. The method of claim 1 further comprising the step of directing a second spray of said aqueous solution of decontaminating agents to impinge on the lower side of said stream of contaminated soil particles and cooperating with said first mentioned spray to form a water barrier surrounding said stream of contaminated particles to minimize the release into the atmosphere of aromatics attached to said contaminated soil particles.

8. Apparatus for decontaminating soil contaminated by environmentally undesirable chemicals comprising, in combination,
   means for shredding the contaminated soil into particles of substantially uniform maximum size;
   means for conveying the contaminated soil particles at a selected rate to an overhead position relative to a non-contaminated surface;
   means for discharging said contaminated soil particles in a stream from said overhead position to form a growing cone-shaped mass of contaminated particles on said non-contaminated surface;
   means for directing a spray of an aqueous solution of decontaminating agents into said downwardly directed stream of contaminated particles in a direction substantially parallel to and within said stream of contaminated particles;
   thereby wetting said particles and assisting in downward rolling movement of particles down the sides of said conical pile to expose more of the surfaces of said contaminated soil particles to contact with said aqueous solution.

9. Apparatus for decontaminating soil contaminated by environmentally undesirable chemicals comprising, in combination,
   means for shredding the contaminated soil into particles of substantially uniform maximum size;
   means for conveying the contaminated soil particles at a selected rate to an overhead position relative to a non-contaminated surface;
   means for downwardly discharging a stream of said contaminated soil particles from said overhead position to form a growing cone-shaped mass of contaminated particles on said non-contaminated surface;
   means for concurrently directing a spray of an aqueous solution of decontaminating agents substantially parallel to and within said stream of contamined particles, thereby wetting said particles and assisting in downward rolling movement of particles down the sides of said cone shaped mass to expose more of the surfaces of said contaminated soil particles to contact with said aqueous solution;

means for detecting the water content of the contaminated soil particles prior to treatment;

means for detecting the water content of said contaminated soil particles in said cone shaped mass; and means for controlling the flow rate of said aqueous solution to maintain a selected minimum moisture content in said growing conical mass of contaminated soil particles.

10. The apparatus of claim 9 further comprising a computer;

means for supplying first input signals to said computer indicating the mass flow delivery rate of said contaminated soil particles to said overhead position;

means for continuously measuring the water content of said growing conical mass of contaminated soil particles and generating second input signals to said computer; and means controlled by said computer for varying the volume of said spray of liquid solution of deeontaminating agents to maintain a selected minimum water content and concentration of decontaminating agents in said conical growing mass of said contaminated particles.

11. The apparatus of claim 10 further comprising means operable by said computer for indicating the total mass of soil particles treated.

12. The apparatus of claim 10 further comprising means operable by said computer for indicating the total gallonage of treatment fluid applied to the contaminated soil particles.

13. The apparatus of claim 8 further comprising means for directing a second spray of said aqueous solution of deeontaminating agents against the under side of said stream of contaminated soil particles;

said second spray cooperating with said first mentioned spray to form a water barrier around said stream to minimize discharge into the atmosphere of aromatics attached to said contaminated soil particles.

\* \* \* \* \*